United States Patent [19]
Goodman et al.

[11] Patent Number: 6,033,458
[45] Date of Patent: Mar. 7, 2000

[54] COATED MATERIALS

[75] Inventors: Katharine Elizabeth Goodman, Henley on Thames; John William Hayes, Reading; Chandresh Nemchand Malde, Reading; Michael Ian Petch, Reading, all of United Kingdom

[73] Assignee: Johnson Matthey Public Limited Company, London, United Kingdom

[21] Appl. No.: 09/070,557

[22] Filed: Apr. 30, 1998

[30] Foreign Application Priority Data

May 9, 1997 [GB] United Kingdom .................. 9709340

[51] Int. Cl.$^7$ ..................................... B01D 53/22
[52] U.S. Cl. ................... 95/45; 95/116; 95/902; 502/4; 502/64; 502/345
[58] Field of Search ............... 95/45, 116, 902; 502/4, 64, 345

[56] References Cited

U.S. PATENT DOCUMENTS

| | | | |
|---|---|---|---|
| 5,723,397 | 3/1998 | Verduijn | 502/4 |
| 5,753,121 | 5/1998 | Geus et al. | 210/490 |
| 5,895,769 | 4/1999 | Lai | 502/4 |

FOREIGN PATENT DOCUMENTS

| | | |
|---|---|---|
| 0 149 966 | 11/1984 | European Pat. Off. . |
| 01296990 | 9/1993 | Japan . |
| 2 045 104 | 2/1980 | United Kingdom . |
| WO 94/05608 | 9/1993 | WIPO . |

OTHER PUBLICATIONS

Continuous films of zeolite ZSM–5 on modified gold surfaces, S. Mintova et al., Chem. Commun., 1997, pp. 15–16.

*Primary Examiner*—Thomas Dunn
*Attorney, Agent, or Firm*—Ratner & Prestia

[57] ABSTRACT

A substantially complete coating of a zeolite onto a material such as catalyst particles can be achieved by treating the material prior to or simultaneously with zeolite formation, with a polyelectrolye. Copper catalyst systems show good hydrogen storage while blocking access of hydrocarbons to the catalyst.

16 Claims, No Drawings

COATED MATERIALS

This invention concerns improvements in coated materials. More especially, it concerns a method of coating materials with zeolite-type substances, and products thus obtained.

It has previously been proposed to coat particulate materials with a zeolite. For example, International Application WO 94/05608 (BP Chemicals Ltd), discloses a catalyst which is capable of absorbing and/or reacting with hydrogen. Such a hydrogen storage material consists preferably of a gold/ceria catalyst having a porous coating or membrane, for example a zeolite which acts as a molecular sieve, preventing access of larger molecules such as hydrocarbons, from reaching the catalyst. This has the result that the equilibrium of the dehydrogenation reaction disclosed in the said patent application is shifted, with a consequential increase in yield of the desired dehydrogenated product. Such reactions are very important industrially.

In particular, we have discovered that $Au/CeO_2$ can store hydrogen by reversible adsorption, but a $Rh/La_2O_3$—$ZrO_2$ system is capable of consuming 5 times the amount of hydrogen retained by $Au/CeO_2$. However, such a system has complicated thermochemistry which does not give a definite exotherm, and also can catalyse $C_2$ hydrocarbons to methane and hydrogen, thus reducing overall yield of desired products. We have now seen hydrogen storage of 20 times the $Au/CeO_2$ system, using a copper-based system.

We have followed the teaching of the above International Application, in order to deposit a zeolite coating on such a copper catalyst, but were unable to achieve a satisfactory coated product. We discovered that whilst the zeolite did form in the reaction mixture, it was not depositing on the particles of catalyst to produce a coated product.

Other methods of coating available in the literature vary from simple contact between a solid substrate and a zeolite gel, which does not give a very good quality membrane, to pulsed laser deposition which does show good quality membrane formation but is an extremely expensive technique and is unlikely to be economically or even technically practical in large scale processes.

A paper has recently been published which concerns the formation of a thin continuous film of zeolite ZSM-5 on gold-plated silver plates. The gold surface was silanised, the surface charge reversed by treatment with a solution of a cationic polymer and then treated with a colloidal suspension of ZSM-5 crystals(Chem. Commun. 1997,15).

The ability to coat zeolites reliably onto materials such as catalyst particles or catalyst bodies, monolithic bodies of various types etc, could be very useful. Zeolites, according to their type and the size of their pores, may be used for many desirable uses including acting as a molecular sieve or absorbing molecules. Hereafter, however, we concentrate on the coating of zeolite onto a hydrogen storage material or catalyst, but the invention is not to be understood as being limited thereto.

The present invention provides a method of coating a material with a synthetic zeolite, said method comprising the treatment of the material with a polyelectrolyte prior to or simultaneously with formation of the zeolite in an alkaline reaction mixture surrounding the material.

We have found that the product coated material does carry a substantially complete coating of the zeolite. It is believed that such a coating is actually of microcrystallites of the zeolite. The method may be repeated or modified in order to provide a second coating, a more complete coating or thicker coating, or possibly to deposit a different coating.

A material of particular interest to us is, as discussed above, a catalyst which also acts as a hydrogen storage material. An example is copper oxide (eg 10% by wt, calculated as Cu) deposited on an oxidic support such as silica and/or alumina. The catalyst may be prepared in conventional manner by impregnating a silica carrier with a copper salt solution, and calcining. A copper-based catalyst or hydrogen storage material which utilises the Cu(II)-Cu(0) cycle may be found to be more selective. Other materials such as palladium or other metal membranes or sheets, other catalyst particles, ceramic materials and metal oxide particles, may be used as the support.

Polyelectrolytes are known substances commercially available from a number of sources. They are primarily marketed as flocculation aids for recovering suspended particulate minerals or the like. It has also been proposed in JP 01296990 to utilise a 0.01–1% by wt solution of polyelectrolyte to coat a ceramic carrier prior to coating the carrier with a biocatalyst, in order to yield an immobilised biocatalyst. The present invention requires a significantly different product.

At this time, a preferred polyelectrolyte is a polyacrylamide, suitably the polyacrylamide PE-1679 marketed by Allied Colloids Ltd, England. It may be used as an aqueous solution, for example of 4 wt %, preferably in alkaline solution of pH 10 to pH 11. Another suitable polyelectrolyte is a homopolymer of dialyl and dimethyl ammonium chloride, which may also be purchased from Allied Colloids Ltd. Such a material is a convenient low viscosity liquid with cationic activity.

The formation of the synthetic zeolite coating may be carried out according to generally known procedures, for example by forming a zeolite precursor solution or gel and suspending the catalyst particles therein. This process step may be carried out at an ambient temperature, or at moderately elevated temperatures, eg up to about 60° C. The mixture is then autoclaved for an extended time, such as autoclaving for 24 hours at 90–100° C. At present, the preferred zeolite is a K-3A zeolite, which has small pores which permit the passage of hydrogen, oxygen and water molecules, but does not admit larger organic molecules.

Although water is the only solvent to be considered in the deposition of the zeolite, it may be desirable to assist agglomeration of the zeolite by admixing a non-miscible organic solvent, in order to deposit a thicker coating.

According to the particular application of the zeolite-coated product, other zeolites may be used, and, for example, the Al/Si ratio may be adjusted for particular uses. Included within the term "zeolite" is that material known as silicalite. The zeolite may be modified in situ by ion exchange with a Group I metal, for example potassium ions may be exchanged for sodium ions in order to alter a Na-4A zeolite to a K-3A zeolite. Such 3A zeolites may offer improved performance and improved lifetime in the uses of present interest to the Applicants. Rubidium ions may also be used, and RbBr appears to offer a zeolite coating with improved stability in cycling processes.

Desirably, after formation of the zeolite-coated product, the product is calcined, eg at temperatures about 500° C., until the product is stabilised and shows no residual carbon (for example by microprobe) analysis.

The present invention is illustrated by the following examples which are not to be regarded as limiting the present invention in any way.

EXAMPLE 1

Preparation of Zeolite 4A-Coated Cu/Silica Hydrogen Storage Material

Cu(II) acetate (6.29 g) was dissolved in a dilute solution of ammonia. The resulting copper solution was impregnated onto silica (20 g) (3 mm spheres, Norton, USA) with gentle heating. The material was dried at 100° C. then calcined at 500° C. to produce 10% Cu (oxide) on silica.

Pre-treatment was effected by adding the Cu/silica spheres (5 g) to an aqueous alkaline solution (dilute ammonia) of 4 wt % Percol 1697 (Allied Colloids Ltd) polyelectrolyte. The sample was then washed in dilute ammonia.

A zeolite gel was prepared by adding a solution of sodium metasilicate (15.51 g in 52 ml $H_2O$) to a rapidly stirred solution of sodium aluminate (6.07 g in 52 ml $H_2O$). The polyelectrolyte-coated spheres were added to the gel, and this mixture was agitated for 2 hours. The mixture was then transferred to a PTFE-lined autoclave bomb. The bomb was sealed than heated to 100° C. for 24 hours. The bomb was then cooled to room temperature, opened and the contents washed with dilute ammonia to remove excess zeolite. The spheres were dried in an oven at 120° C., and finally calcined at 500° C. for 2 hours.

Testing of Coated Hydrogen Storage Material

To test the hydrogen storage capacity of the coated $Cu/SiO_2$:

A 1 g sample of the material was placed in a quartz reactor tube then oxidised by heating in flowing air to 500° C. The sample was then purged with $N_2$. At a reactor temperature of 500° C., a gas mixture of 5% hydrogen in helium was passed over the sample; the composition of the outlet of the reactor was monitored by use of a mass spectrometer. The 1 g sample was shown to remove 20 ml of hydrogen.

The sample was re-oxidised in flowing air then purged with nitrogen. At a reactor temperature of 500° C., ethane was then passed over the sample for 3 minutes at a flow rate of 40 ml/min. The gas from the outlet of the reactor was collected: analysis by gas chromatograph showed that 0.85 ml of $CO_2$ had been produced.

Assuming the following reaction:

$$CuO + H_2 \rightarrow H_2O + Cu$$

one oxygen atom is used for every hydrogen molecule removed.

Assuming the following reaction:

$$7CuO + C_2H_6 \rightarrow 2CO_2 + 3H_2O + 7Cu$$

then 3.5 oxygen atoms are used for every $CO_2$ molecule produced.

Thus, with the zeolite coating, 6.7 times more CuO was accessible by hydrogen than by ethane.

EXAMPLE 2

Preparation of a Zeolite 3A-Coated Cu/Silica Hydrogen Storage Material

The zeolite 4A-coated material prepared in Example 1 (5 g) was immersed in a mobile solution of potassium chloride (2 M in 500 ml) for 48 hours. The material was then thoroughly washed with water to remove the excess salt, dried at 120° C., and calcined at 500° D for 2 hours. Electron microprobe analysis (TEM) of the samples showed that ~50% of the sodium cations that exist in the 4A coating have been exchanged by the larger potassium cations.

When the coating was tested (as described in Example 1) over 8 times more CuO was accessible by hydrogen than by ethane.

COMPARATIVE EXAMPLE 1

Testing of Uncoated Cu/Silica

The uncoated $Cu/SiO_2$ was tested using the method described in Example 1. The hydrogen uptake was 22 ml and the $CO_2$ production was 6.6 ml. Equal amounts of CuO were accessed by $H_2$ and ethane.

COMPARATIVE EXAMPLE 2

Preparation of Zeolite 4A-Coated Sample Without Using Polyelectrolyte

A sample of Cu/silica was coated with zeolite as described in Example 1, without first treating it with the polyelectrolyte. When the coating of this sample was tested, only 3 times more CuO was accessed by $H_2$ than by ethane.

We claim:

1. A method for the deposition of a coating of a synthetic zeolite onto a substrate material, comprising the treatment of the material with a polyelectrolyte prior to or simultaneously with formation of the zeolite in an alkaline reaction medium surrounding the material.

2. A method as claimed in claim 1, wherein the zeolite is a Na-4A zeolite.

3. A method as claimed in claim 2, wherein the zeolite is modified in situ after deposition, by ion exchange.

4. A method as claimed in claim 3, wherein the zeolite is modified by ion exchange with a Group I metal.

5. A method as claimed in claim 4, wherein a Na-4A zeolite is modified to at least partially become a K-3A zeolite.

6. A method as claimed in claim 1, wherein the polyelectrolyte is a polyacrylamide or a homopolymer of dialyl and dimethyl ammonium chloride.

7. A method as claimed in claim 1, wherein the medium for zeolite formation is at pH 10 to 11.

8. A method as claimed in claim 1, wherein the material is a catalyst.

9. A method as claimed in claim 8, wherein the catalyst also acts as a hydrogen storage material.

10. A method as claimed in claim 9, wherein the catalyst comprises copper oxide deposited on an oxidic support.

11. A method as claimed in claim 1, wherein the material is selected from metal membranes or sheets and metal oxide particles.

12. A method as claimed in claim 1, comprising the step of autoclaving the coated material.

13. A method as claimed in claim 1, comprising the step of depositing a second coating.

14. A copper catalyst deposited on an oxidic support and having a substantially complete coating of a zeolite.

15. A catalyst as claimed in claim 14, wherein the zeolite is a 3A or 4A zeolite.

16. A catalytic process in which hydrogen is stored, characterised by the use of a catalyst as claimed in claim 14.

* * * * *